US010323613B2

(12) United States Patent
Bailey (10) Patent No.: US 10,323,613 B2
(45) Date of Patent: Jun. 18, 2019

(54) ENGINE EXHAUST PARTICULATE REMOVAL AND UTILIZATION

(71) Applicant: Illinois Valley Holding Company, Chillicothe, IL (US)

(72) Inventor: Brett Bailey, Dunlap, IL (US)

(73) Assignee: Illinois Valley Holding Company, Chillicothe, IL (US)

( * ) Notice: Subject to any disclaimer, the term of this patent is extended or adjusted under 35 U.S.C. 154(b) by 930 days.

(21) Appl. No.: 14/916,381

(22) PCT Filed: Aug. 2, 2013

(86) PCT No.: PCT/US2013/053439
§ 371 (c)(1),
(2) Date: Mar. 3, 2016

(87) PCT Pub. No.: WO2014/025646
PCT Pub. Date: Feb. 13, 2014

(65) Prior Publication Data
US 2016/0215739 A1    Jul. 28, 2016

Related U.S. Application Data

(60) Provisional application No. 61/742,341, filed on Aug. 8, 2012.

(51) Int. Cl.
*F01N 3/00*      (2006.01)
*F02M 37/00*   (2006.01)
(Continued)

(52) U.S. Cl.
CPC ........... *F02M 37/0064* (2013.01); *C10L 1/06* (2013.01); *C10L 10/02* (2013.01); *F01N 3/0233* (2013.01);
(Continued)

(58) Field of Classification Search
CPC .... F02M 37/0064; F02M 37/22; F02M 21/12; F02M 25/14
(Continued)

(56) References Cited

U.S. PATENT DOCUMENTS 4,864,821 A * 9/1989 Hoch .................... F01N 3/0222
60/274
7,992,382 B2   8/2011 Bailey
8,051,840 B2  11/2011 Cushing

FOREIGN PATENT DOCUMENTS

DE    102010064199 A1   6/2012
EP       0230140 A1       7/1987
WO       90/06423         6/1990

OTHER PUBLICATIONS

English translation of DE 102010064199 A1 (dated Jun. 28, 2012).*
(Continued)

*Primary Examiner* — Jason D Shanske
(74) *Attorney, Agent, or Firm* — Miller Canfield (57) ABSTRACT

A combined fuel for use in an internal combustion engine comprises a combination of partially combusted particles from the engine exhaust, said particles being in suspension in ordinary fuel. A method and apparatus for recycling partially combusted particulate material by collecting those materials. The particulate materials are combined with ordinary fuel in the fuel system to form the combined fuel which is filtered and fed the engine for combustion.

32 Claims, 8 Drawing Sheets

(51) Int. Cl.
  *F02M 37/22* (2019.01)
  *F02M 21/12* (2006.01)
  *F02M 25/14* (2006.01)
  *F02M 27/08* (2006.01)
  *F01N 3/023* (2006.01)
  *C10L 1/06* (2006.01)
  *C10L 10/02* (2006.01)

(52) U.S. Cl.
  CPC ............ *F02M 21/12* (2013.01); *F02M 25/14* (2013.01); *F02M 27/08* (2013.01); *F02M 37/22* (2013.01); *C10L 2200/0423* (2013.01); *C10L 2250/06* (2013.01); *C10L 2270/023* (2013.01); *Y02T 10/121* (2013.01); *Y02T 10/34* (2013.01)

(58) Field of Classification Search
  USPC .......................................................... 60/297
  See application file for complete search history.

(56) References Cited

OTHER PUBLICATIONS

Majewski, W. Addy. "Filters Regenerated by Fuel Combustion." Diesel Technology Guide—Diesel Filter Systems. Dieselnet, 2009. Web. May 27, 2010. <http://www.dieselnet.com/tech/dpf_sys_fuel.html>.

\* cited by examiner

ENGINE EXHAUST PARTICULATE REMOVAL AND UTILIZATION

CROSS REFERENCE TO RELATED APPLICATIONS

This application is a U.S. National Phase Application of International Application PCT Application No. PCT/US2013/53439 filed on Aug. 2, 2013, which claims the benefit of priority from U.S. Provisional Patent Application Ser. No. 61/742,341 filed Aug. 8, 2012 by the present inventor. The disclosures of International Application PCT Application No. PCT/US2013/53439 and U.S. Provisional Application 61/742,341 are incorporated herein by reference.

DISCUSSION OF PRIOR ART

Internal Combustion engines produce particulate matter which has been always been considered a waste byproduct of combustion and harmful to the environment. Governments around the world have created legislation focused on reducing the level of particulate matter along with Nitrous Oxides (NOx), hydrocarbons and carbon monoxide. To reduce the particulate exiting the tailpipe, the state of the art includes a Diesel Particulate Filter (DPF) to trap the particles in an engine's exhaust before being released into the atmosphere.

Commercially available active Diesel exhaust treatment systems utilize a particulate filter which is thermally regenerated. Diesel fuel is a convenient source of energy for such regeneration. During active filter regeneration, the exhaust gas temperature can be increased by combusting an additional quantity of fuel in the exhaust system using specialized hardware and using one of the following methods:

Flame combustion—the fuel is combusted in a fuel burner, usually with a dedicatedsupply of combustion air, with the flame entering the exhaust system.

Catalytic combustion—the fuel is introduced through an exhaust injector, evaporated and mixed with exhaust gas, and oxidized over an oxidation catalyst.

Combined flame and catalytic combustion—a combination of the above methods, where a fuel burner is followed by a catalytic combustion system. Further details can be found in "Filters Regenerated by Fuel Combustion" by W. Addy Majewski.[1] In short, the removed particulate is burned and creates CO2 which is passed into the atmosphere.

[1] Majewski, W. Addy. "Filters Regenerated by Fuel Combustion." Diesel Technology Guide—Diesel Filter Systems. Dieselnet, 2009. Web. 27 May 2010. <http://www.dieselnet.com/tech/dpf_sys_fuel.html>.

U.S. Pat. No. 7,992,382 describes using a back flow of filtered exhaust gases to regenerate the filter and the removed particulates are sent to a burner. This arrangement also has the disadvantage of creating carbon dioxide without generating usable output work. It would be advantageous to dispose of the removed particulates without using fuel or other energy to burn the particulates. The present invention is directed toward overcoming one or more of the deficiencies of the prior art.

BRIEF SUMMARY OF THE PRESENT INVENTION

Broadly speaking, the present invention is directed toward utilizing the removed particles as a portion of the fuel for the internal combustion engine. Hence, there is proved a combined fuel for use in an internal combustion engine comprising a combination of ordinary fuel and partially combusted particles from the engine exhaust, said particles being in suspension in the ordinary fuel.

In accordance with the present invention there is provided a method of recycling partially combusted particulate material from an exhaust system of an internal combustion engine by collecting the partially combusted particulate materials and allowing them to agglomerate; deagglomerating the particulate materials and feeding the same into a fuel system of the engine; combining the deagglomerated particulate materials with a fuel in the fuel system to form a combined fuel; filtering the deagglomerated materials and the fuel; and feeding the combined fuel to the engine for combustion thereof.

In accordance with another aspect there is provided a system for recycling partially combusted particulate material from an exhaust system of an internal combustion engine having a fuel system which includes a receptacle for receiving partially combusted particulate materials removed from the engine exhaust system, said materials being agglomerated; transport means for transporting said agglomerated materials from the receptacle to the fuel system; deagglomerating apparatus associated with the transport means for deagglomerating said agglomerated materials; means for combining the deagglomerated materials with a fuel in the fuel system to form a combined fuel; and means for feeding the combined fuel to the engine.

ADVANTAGES OF PRESENT INVENTION

In accordance with the present invention there is provided a particulate trap regeneration system which provides one or more of the following advantages: 1—transforms a waste byproduct into useable fuel for powering the internal combustion engine; 2—allows certification of high particulate matter producing engine designs such as "massive EGR" or Stoichiometric Compression Ignition (SCI) to stringent emissions standards; 3—removes particulate matter without elevating exhaust temperature levels; 4—allows significant reduction of expensive rare earth elements that have finite known quantities; 5—simplifies a regeneration control system; 6—precludes the thermal gradients in the filter thereby improving reliability and durability; 7—eliminates use of fuel to regenerate the filter thereby improving fuel economy; 8—allows older engine designs (mainly those with lower fuel injection pressures) to meet current emissions regulations; and/or 9—allows retrofitting of legacy engines to meet emissions criteria.

The resultant benefits are less fuel consumption; potential for commercial availability of low NOx, but high engine particulate matter designs; a less expensive system then (or compared to) thermally regenerated systems which require sophisticated hardware and control systems; elimination of the need for oxidizing the particulate in the filter which by high temperature and subsequent thermal gradients can damage the filter, the intumescent wrap, and any downstream aftertreatment; and reduction and possibly elimination of downtime required for forced active regeneration and ash maintenance. The energy in the particles trapped in the filter are recycled into the fuel where they are combusted providing power from previously waste particulate matter. The present invention allows for an engine to be designed for high particulate matter and low NOx output while still retaining high overall thermal efficiency.

BRIEF DESCRIPTION OF THE DRAWINGS

The drawings illustrate the best known mode of carrying out the present invention and show one embodiment of an engine exhaust particulate removal and utilization system incorporating the above advantages and in which—

DETAILED DESCRIPTION

Figure 1:
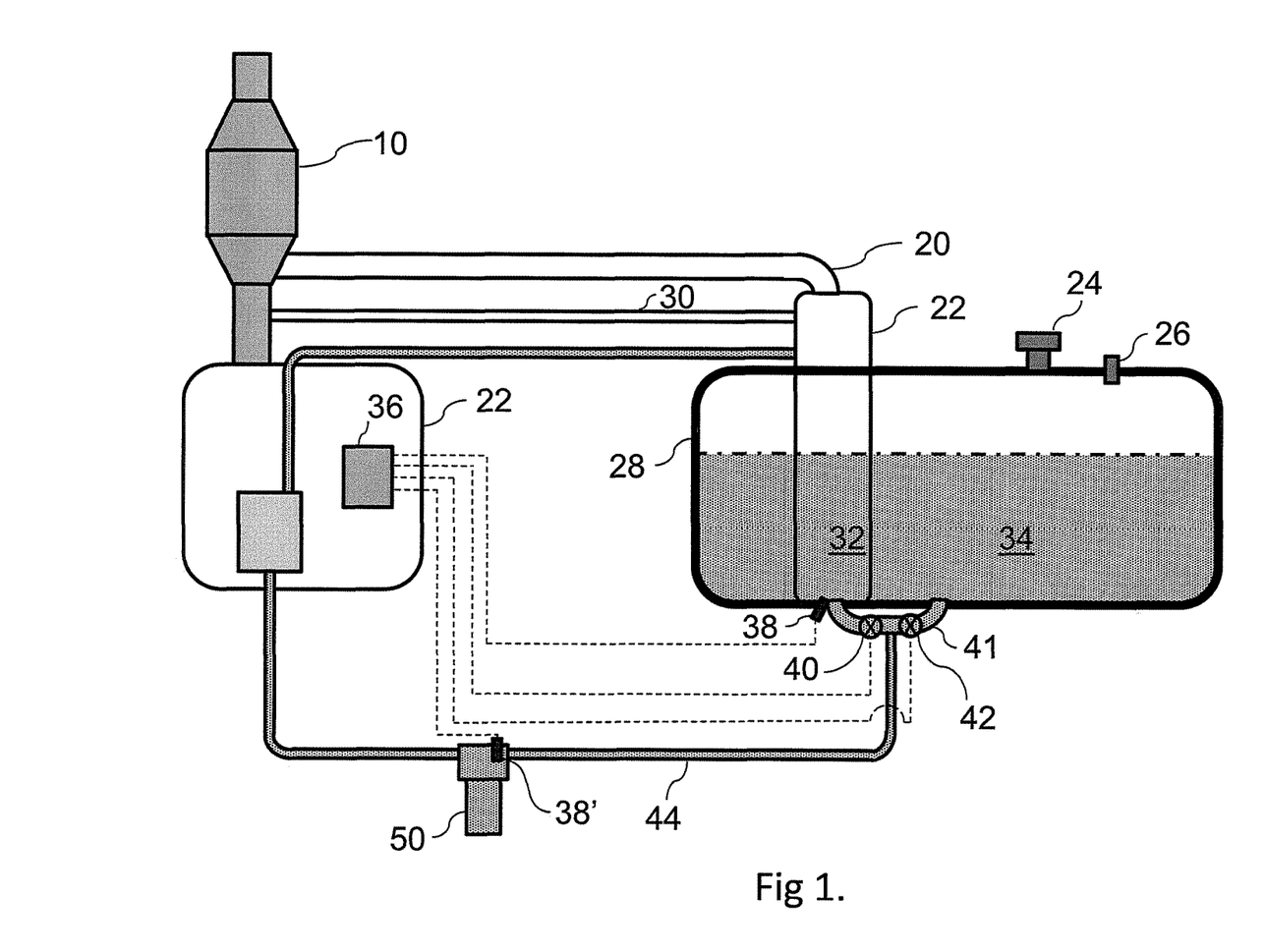
FIG. 1 is a diagrammatic illustration of a system embodying the present invention and showing a settling tank that is concurrently filled with fuel as the main tank is filled.
Figure 2:
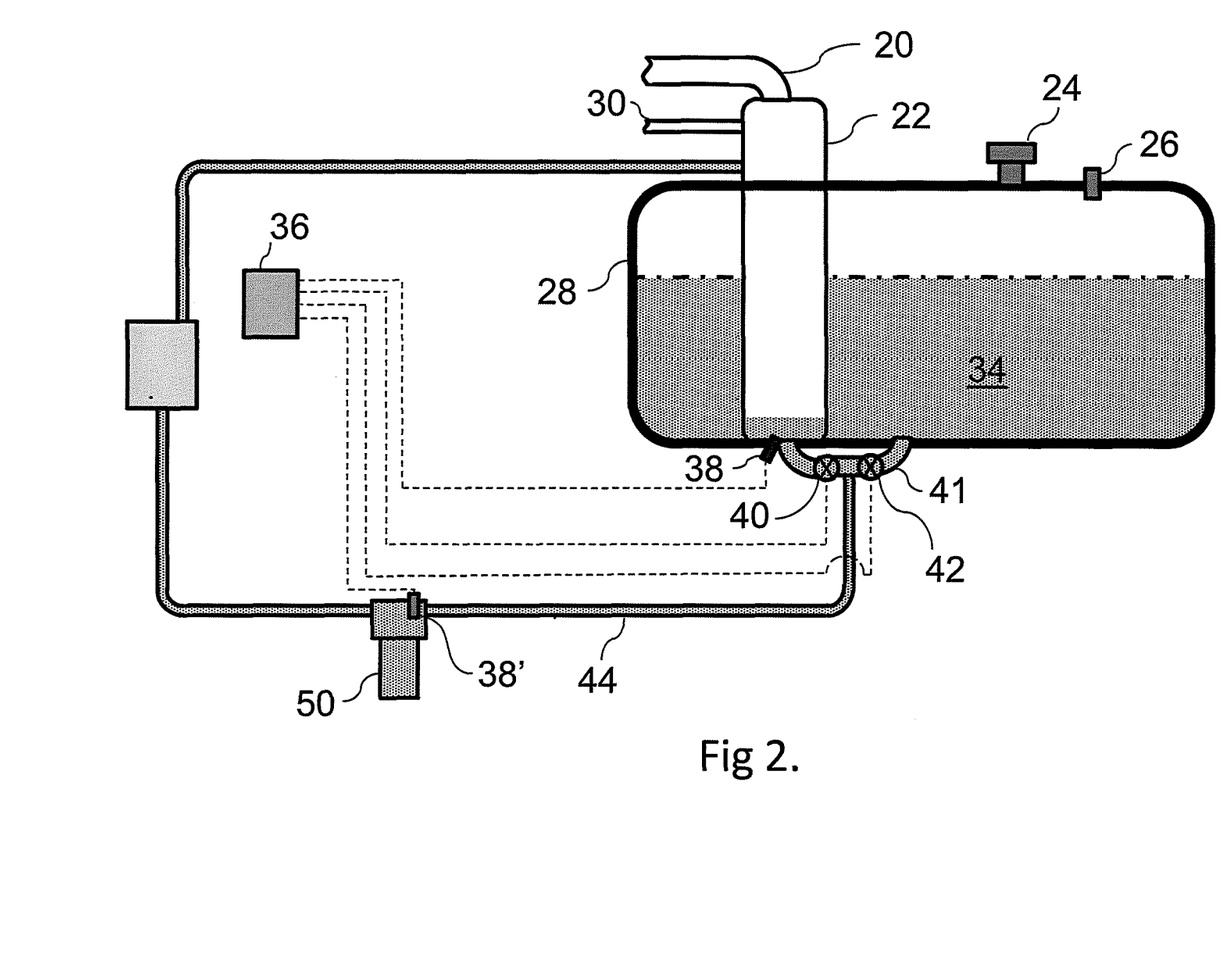
FIG. 2 is a view, similar to FIG. 1, and illustrates the consumption of the fuel from the settling tank to create additional space within the settling tank for maximum regeneration efficiency.

FIG. 1 illustrates a particulate matter regeneration system operative to create a new fuel that incorporates solid nanoparticles of particulate matter suspended in a regular fuel. When a fuel tank 28 is filled, an embedded settling tank 22 is flooded with incoming fuel 34 so that there is not a loss of total fuel tank capacity. This creates a separate fuel volume designated by the numeral 32. Of course, separate tanks could be utilized, but this arrangement eliminates a packaging constraint. A normally-open valve 42 in conduit 41 is then closed and a normally-closed valve 40 is opened so that the associated engine (not shown) consumes only the fuel 32 from the embedded settling tank 22 to create a volumetric space required for non-thermal particulate regeneration. An ultrasonic mixer 38 is arranged for use as an ultrasonic level sensor so that the fuel is only removed until a determined level is reached and then valve 42 is opened and valve 40 is allowed to close. Of course a separate level sensor may also be utilized.

Figure 3:
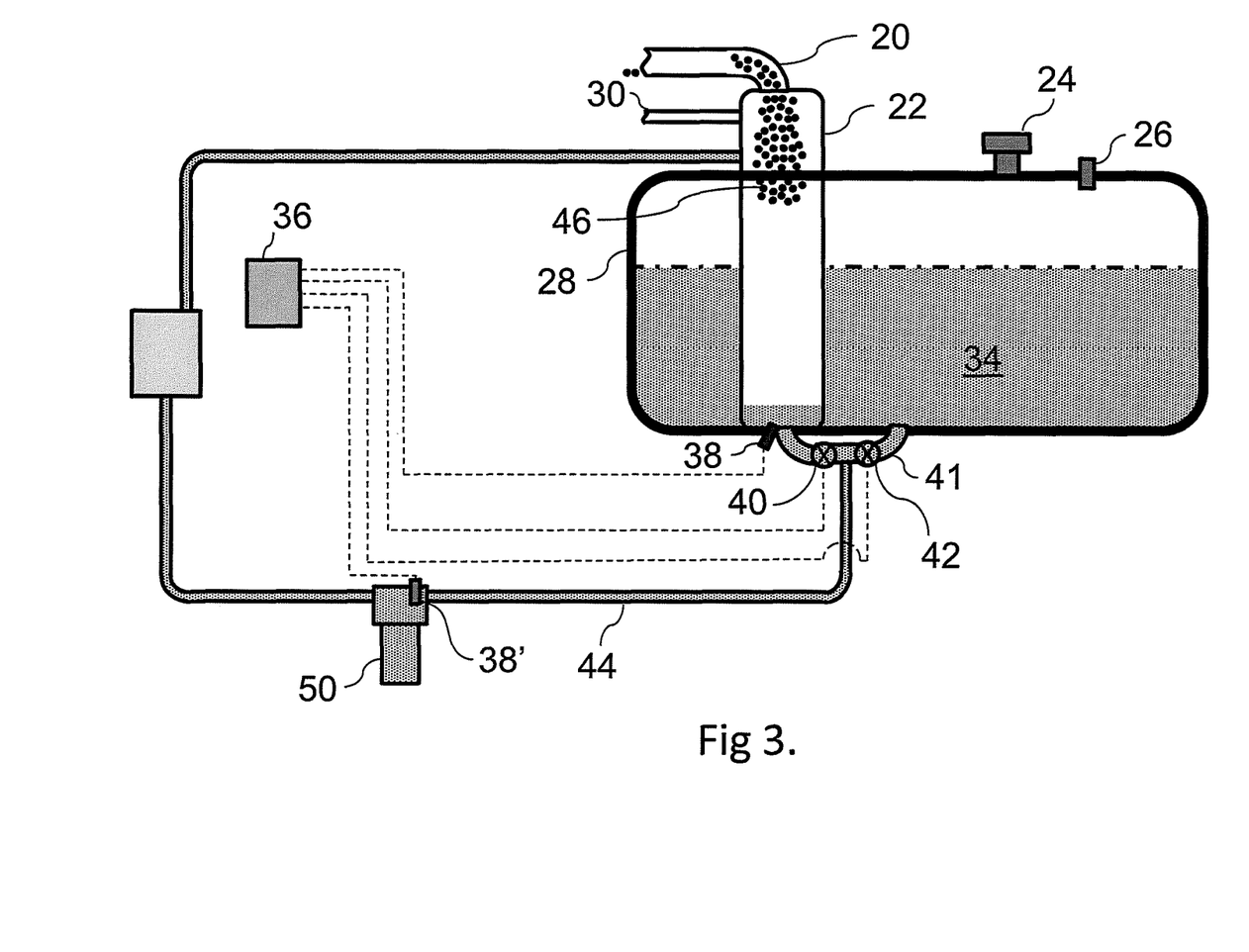
FIG. 3 is a diagrammatic illustration showing the transport of particulate matter from a particulate filter to the settling tank.

An electronic control module (ECM) 36 determines that regeneration of an associated particulate filter 10 is required. Regeneration utilizing reverse flow of filtered exhaust gas removes particulate matter from the filter. The separated particulate and exhaust gases are blown into the embedded settling tank 22 and pressurizing settling tank 22 to some degree. The pressure is relieved by the vent return line 30 allowing most of the gases minus the particulate matter to be vented back to upstream of the particulate filter. The ECM, after a determined time, turns on the ultrasonic mixer 38.

Figure 4:
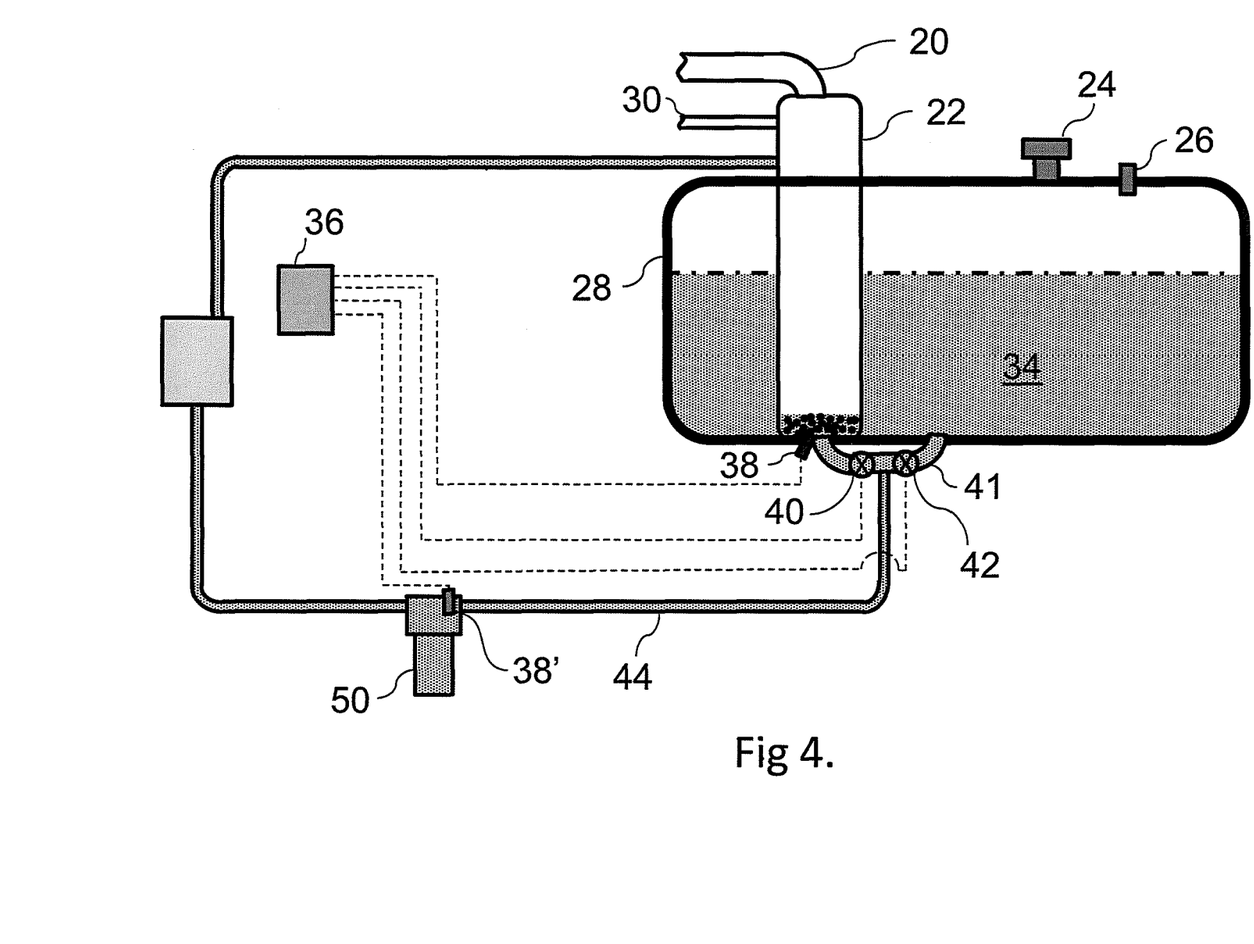
FIG. 4 is a view, similar to FIG. 3, illustrating the settling of the particulate matter to the bottom of the settling tank.
Figure 5:
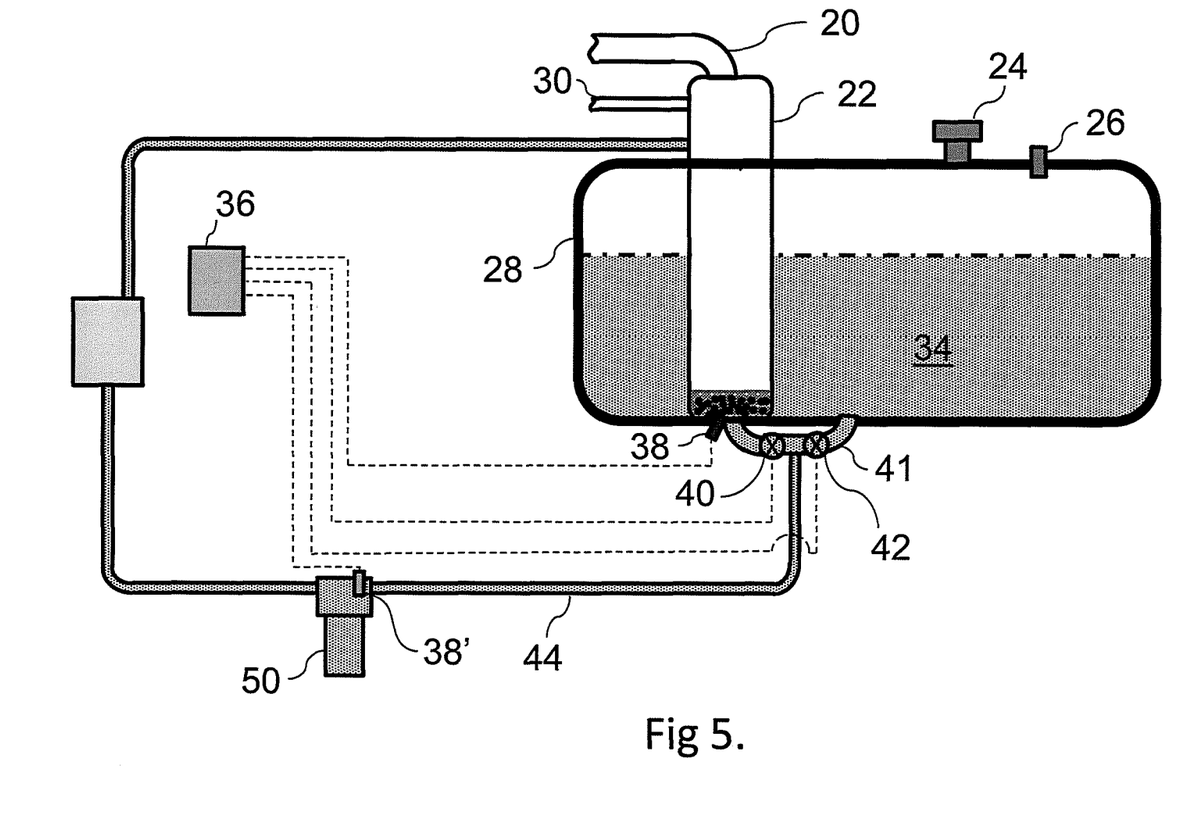
FIG. 5 is a diagrammatic illustration showing activation of an ultrasonic mixer to begin deagglomeration of the particulate matter.
Figure 6:
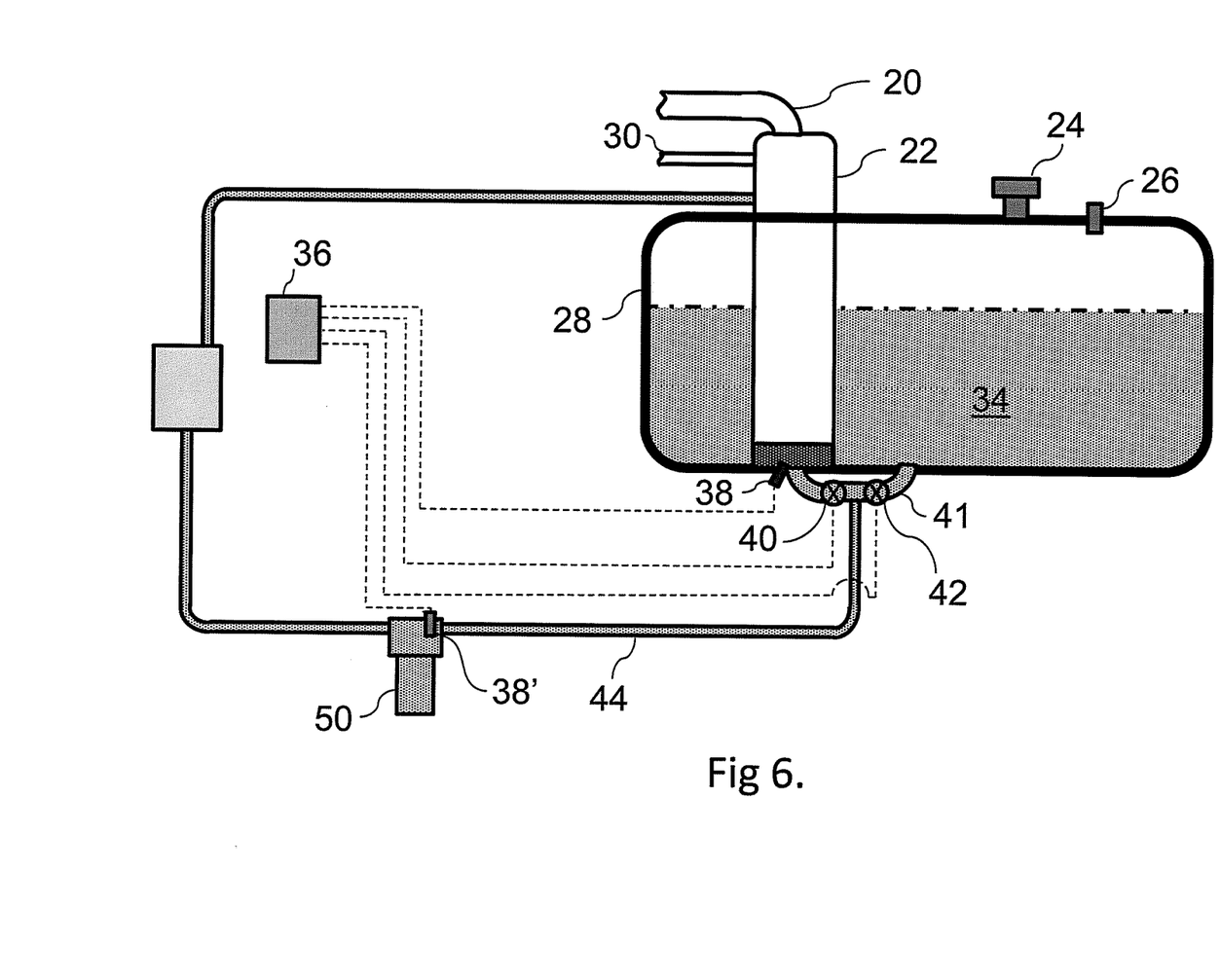
FIG. 6 is a view, similar to FIG. 5, illustrating the completion of deagglomeration of the particulate matter.

The particulate matter 46 fed to the receptacle or settling tank 22 can be described as nano particles which are agglomerated. Hereafter these are referred to as agglomerated particulate matter particles 46. The agglomerated particulate matter particles 46 are then hit with alternating high and low ultrasonic pressure waves created by a deagglomerater, for example the ultrasonic mixer 38. These waves cause cavitation in the fuel and effectively deagglomerate the particulate matter particles to an absolute level below 6-7 microns. If a fuel filter 50 is used in the fuel system, the deagglomeration level is advantageously to a micron size where the particles 46 will pass through the fuel filter 50. It is believed that the disclosed arrangement can deagglomerate to the original particle size. Preferably a second ultrasonic mixer 38' is placed at the fuel filter 50 to assure deagglomeration of particles 46 to no more than the 2 micron size. It is perceived possible to deagglomerate the particles even to lower levels. If only one ultrasonic mixer is to be utilized, it preferably is mixer 38' located at the fuel filter 50. Suitable ultrasonic transducers for use as mixers 38 or 38' and arrangement thereof with a fuel filter is illustrated and described in U.S. Pat. No. 8,051,840 B2 issued Nov. 8, 2011 to Timothy J. Cushing, which is incorporated by reference herein in its entirety. Such ultrasonic mixers emit high frequency acoustic waves.

Figure 7:
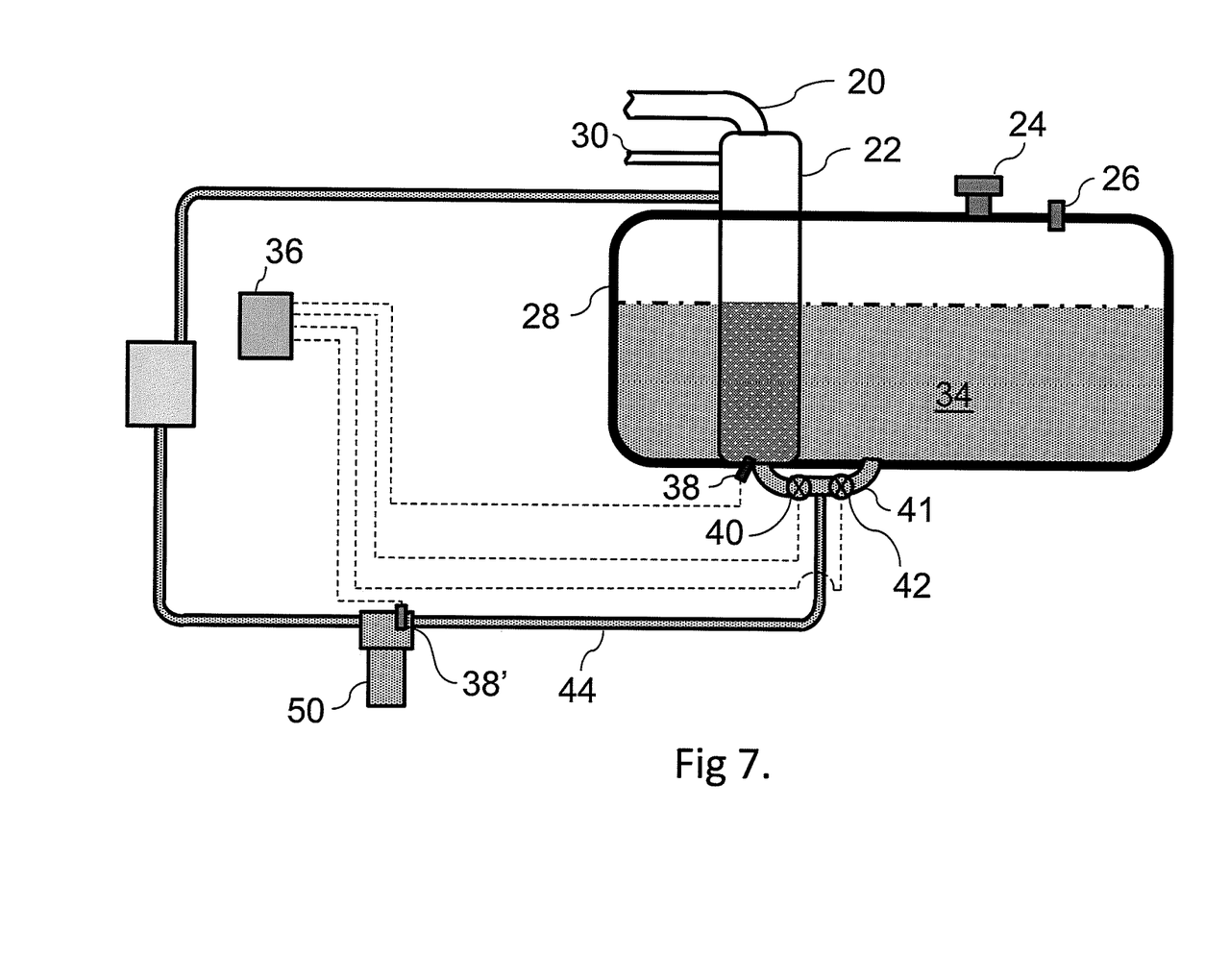
FIG. 7 is a diagrammatic illustration showing gravity filling of the settling tank with fuel.
Figure 8:
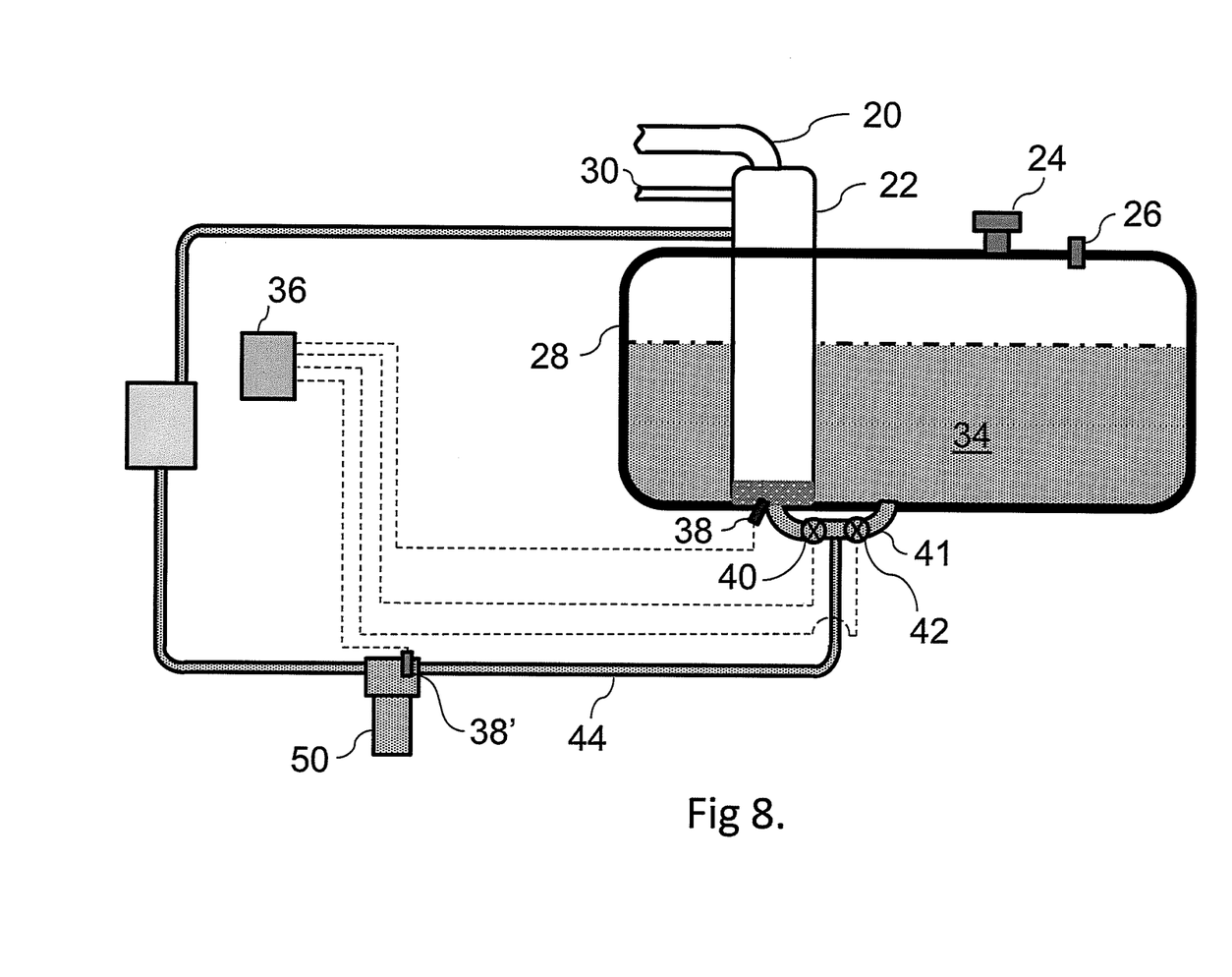
FIG. 8 is a diagrammatic illustration showing feeding the deagglomerated particulate matter and fuel to the engine for consumption.

The mixture of deagglomerated particles 46 and fuel 32 creates a combined fuel in which the deagglomerated partially combusted particles 46 are suspended in ordinary fuel 32 and is then allowed to be diluted with fuel 34 from the main tank 28 by the opening of valve 40. Valve 42 is then closed and valve 40 opened so that conduit 41 can transport the mixed or combined fuel 32 to fuel line 44 so the engine can consume the fuel 32 and suspended particulate matter 46 by exiting fuel line 44 which will pass through the fuel filter or filters before getting to the injection system. Once the preset fuel level 32 is reached valve 40 is closed and valve 42 is opened. The system is now ready for the next regeneration of the particulate filter.

It is now deemed apparent that the above-described apparatus causes particulate matter to be broken down to a size that can pass through a fuel filter. The final product of nanometer particles dispersed in the fuel creates a new and useable fuel.

The above-described apparatus also performs a process which comprises at least some of the following steps the sequence of which may be altered:

1. Filtering exhaust gases with a particulate filter to remove particulate matter which is contained on the filter.
2. Regenerating the filter by reverse flow of filtered gas and removing the particulate matter therefrom.
3. Collecting the removed particulate matter and feeding it to a settling tank and allowing them to agglomerate. The settling tank may have a volume of liquid fuel therein.
4. Placing the particulate matter and at least a portion of the liquid fuel in proximity.
5. Deagglomerating the particulate materials and feeding the same into a fuel system of the engine. The deagglomeration of the particulate matter may be performed in a portion of the liquid fuel volume to suspend the particulate matter therein.
6. Combining additional liquid fuel with the suspension volume.
7. Feeding the suspended particulate matter into a fuel system.
8. Filtering the combined liquid fuel and suspended particulate matter.
9. Feeding the combined fuel to the engine for combustion thereof.

While the above process steps have been described as used with specific apparatus, it should be understood that the steps are not to be limited to such arrangements and that other apparatus may be utilized to perform the steps, for example utilizing the entire fuel tank as the settling tank and ultrasonically deagglomerating the particulate matter only at the fuel filter, which results in the filling of the fuel tank generating a new suspension of particulate matter settled in the fuel tank. Similarly, the specific steps and their sequence may be modified and/or combined to perform the intended result.

While the above description is of the best known mode, it should not be construed as any limitation on the scope of the invention, as other variations will become apparent to those skilled in the art and the scope should be determined only by the scope of the appended claims.

What is claimed is:

1. A method of recycling partially combusted particulate materials from an exhaust system of an internal combustion engine comprising the steps of:
   a. providing a settling tank fluidically connected to a first valve, said first valve having an open condition and a closed condition;
   b. collecting said partially combusted particulate materials in said settling tank and allowing them to agglomerate while said first valve is in said closed condition;
   c. placing said first valve in said open condition and feeding said particulate materials within said settling tank, through said first valve into a fuel system of said internal combustion engine; and
   d. combining said particulate materials with a fuel supplied by said fuel system to form a combined fuel for use by said internal combustion engine.

2. The method of recycling partially combusted particulate materials from an exhaust system as set forth in claim 1, further comprising the step of deagglomerating said particulate materials prior to feeding said particulate materials through said first valve into said fuel system.

3. The method of recycling partially combusted particulate materials from an exhaust system as set forth in claim 1, further comprising the step of filtering said particulate materials and said fuel.

4. The method of recycling partially combusted particulate materials from an exhaust system as set forth in claim 1, further comprising the step of feeding said combined fuel to said internal combustion engine for combustion thereof.

5. The method of recycling partially combusted particulate materials from an exhaust system as set forth in claim 1, wherein the step of collecting said partially combusted particulate materials includes passing engine exhaust through a particulate filter, regenerating said particulate filter by reverse flow of filtered exhaust back through said filter to remove said partially combusted particulate materials from said particulate filter, and collecting said removed particulate materials in said settling tank in said collecting step.

6. The method of recycling partially combusted particulate materials from an exhaust system as set forth in claim 5, including collecting said removed particulate materials in said settling tank wherein said particulate materials agglomerate in the presence of fuel within said settling tank.

7. The method of recycling partially combusted particulate materials from an exhaust system as set forth in claim 2, wherein the step of deagglomerating said particulate materials includes exposing said materials to high frequency acoustic waves.

8. The method of recycling partially combusted particulate materials from an exhaust system as set forth in claim 2, wherein the step of deagglomerating said particulate materials includes using an ultrasonic transducer.

9. The method of recycling partially combusted particulate materials from an exhaust system as set forth in claim 3, including providing a fuel filter in said fuel system for filtering of said combined fuel, and wherein the step of combining the particulate materials with said fuel in said fuel system is upstream of said fuel filter so that the step of filtering occurs after said particulate materials are combined with said fuel.

10. A system for recycling partially combusted particulate materials from an exhaust system of an internal combustion engine having a fuel system, including:
    a receptacle for receiving partially combusted particulate materials removed from said engine exhaust system;
    a first conduit for transporting said particulate materials from said receptacle to said fuel system wherein said particulate materials are combined with a fuel to form a combined fuel;
    a second conduit for feeding said combined fuel to said internal combustion engine; and
    a first valve fluidically connecting said first conduit and said second conduit, said first valve having an open condition and a closed condition;
    wherein said partially combusted particulate materials pass from said first conduit, through said first valve, and into said second conduit when said first valve is in said open condition.

11. The system for recycling partially combusted particulate materials from an exhaust system as set forth in claim 10, wherein said particulate materials are agglomerated and collected in said receptacle and said system further comprising a deagglomerater associated with one of said receptacle or said second conduit operable for deagglomerating said particulate materials within said combined fuel.

12. The system for recycling partially combusted particulate materials from an exhaust system as set forth in claim 10, including a filter associated with said second conduit and said fuel system for filtering said particulate materials and said fuel in said fuel system.

13. The system for recycling partially combusted particulate materials from an exhaust system as set forth in claim 11, wherein said deagglomerater is operative to emit high frequency acoustic waves.

14. The system for recycling partially combusted particulate materials from an exhaust system as set forth in claim 11, wherein said deagglomerater includes an ultrasonic transducer.

15. The system for recycling partially combusted particulate materials from an exhaust system as set forth in claim 14, wherein said ultrasonic transducer is operative to emit high frequency waves.

16. The system for recycling partially combusted particulate materials from an exhaust system as set forth in claim 10, wherein said receptacle includes a fuel tank.

17. The system for recycling partially combusted particulate materials from an exhaust system as set forth in claim 10, wherein said receptacle is associated with a fuel tank.

18. The system for recycling partially combusted particulate materials from an exhaust system as set forth in claim 10, wherein said receptacle is located in a fuel tank.

19. The system for recycling partially combusted particulate materials from an exhaust system as set forth in claim 11, wherein:
    said receptacle is located in a fuel tank;
    said first conduit is in fluid communication with said receptacle, said fuel tank, and said fuel system;
    said deagglomerater includes an ultrasonic transducer; and
    including a filter associated with the one of said first conduit, said receptacle, or said fuel system for filtering said deagglomerated materials and said fuel in said combined fuel of said fuel system.

20. The system for recycling partially combusted particulate materials from an exhaust system as set forth in claim 10, said combined fuel for use in said internal combustion engine comprising a combination of fuel and partially combusted particulate materials from engine exhaust, said particulate materials being in suspension in said fuel.

21. The system as set forth in claim 20, wherein said partially combusted particulate materials have been reduced to a size sufficient to pass through a fuel filter.

22. The system as set forth in claim 20, wherein said combined fuel is filtered prior to use in said internal combustion engine.

23. The system as set forth in claim 22, further comprising a deagglomerater operable for deagglomerating said partially combusted particulate materials; and
wherein said partially combusted particulate materials have been reduced to a size by said deagglomerator sufficient to pass through a fuel filter which filters said combined fuel.

24. A method of recycling partially combusted particulate materials from an exhaust system of an internal combustion engine comprising the steps of:
 a. collecting said partially combusted particulate materials having an original particle size in a settling tank and allowing said partially combusted particulate materials to settle and agglomerate as collected particulate materials that are collected within said settling tank and have a second particle size greater than said original particle size;
 b. combining said collected particulate materials collected in said settling tank with a fuel supplied by said fuel system to form a combined fuel for use by said internal combustion engine;
 c. intermittently feeding said combined fuel into a fuel system and supplying said combined fuel to said internal combustion engine;
 d. deagglomerating said collected particulate materials to deagglomerate said collected particulate materials to a third particle size smaller than said second particle size prior to said feeding of said combined fuel to said internal combustion engine; and
 e. discontinuing said feeding of said combined fuel and then feeding said fuel system with said fuel which is supplied from a main fuel tank.

25. The method of recycling partially combusted particulate materials from an exhaust system as set forth in claim 24, further comprising the step of passing said combined fuel through a fuel filter wherein said deagglomerating of said collected particulate materials is performed prior to said fuel filter to reduce the size of said collected particulate materials to said third particle size which is a micron size that will pass through said fuel filter.

26. The method of recycling partially combusted particulate materials from an exhaust system as set forth in claim 24, wherein said deagglomeration step further comprises the step of hitting the agglomerated particulate materials with ultrasonic pressure waves using an ultrasonic mixer acting on said combined fuel to deagglomerate said collected particulate materials from said second particle size to said third particle size within said combined fuel.

27. The method of recycling partially combusted particulate materials from an exhaust system as set forth in claim 26, said combining step further comprises the step of forming said combined fuel within said settling tank, and said method further comprising the step of diluting said combined fuel with additional fuel received from a main fuel tank for said feeding of said combined fuel to said internal combustion engine.

28. A system for recycling partially combusted particulate materials from an exhaust system of an internal combustion engine having a fuel system, including:
 a settling tank defining a receptacle, which is engagable with an engine exhaust system to receive partially combusted particulate materials carried by engine exhaust that is removed from said engine exhaust system, said receptacle defining a volumetric space allowing said particulate materials to agglomerate to a larger particulate size and settle within said receptacle as collected particulate materials;
 a first conduit communicating between said settling tank and a fuel system, which permits mixing of said collected particulate materials and a fuel in said fuel system to form a combined fuel which is transportable to said internal combustion engine;
 a second conduit communicating with said first conduit for feeding said combined fuel to said internal combustion engine; and
 a deagglomerator which produces pressure waves to deagglomerate said particulate materials in said combined fuel to a particle size consumable by said internal combustion engine.

29. The system for recycling partially combusted particulate materials from an exhaust system as set forth in claim 28, including a fuel filter associated with said second conduit and said fuel system, which receives and filters said combined fuel after deagglomeration by said deagglomerator.

30. The system for recycling partially combusted particulate materials from an exhaust system as set forth in claim 29, wherein said fuel filter comprises an ultrasonic mixer to deagglomerate said collected particulate materials of said combined fuel from an agglomerated particle size to a smaller deagglomerated particle size which will flow through said fuel filter.

31. The system for recycling partially combusted particulate materials from an exhaust system as set forth in claim 28 wherein said settling tank is provided in combination with a main fuel tank containing said fuel, and said combined fuel is further diluted with fuel received from said main fuel tank which is intermittently supplied to said internal combustion engine after regeneration of an exhaust gas filter of said engine exhaust system.

32. The system for recycling partially combusted particulate materials from an exhaust system as set forth in claim 31 which includes a valve arrangement controlling flow through said first conduit and said second conduit to alternate supplying to said internal combustion engine of either said combined fuel after said regeneration or said fuel from said main tank during said regeneration.

\* \* \* \* \*